Nov. 9, 1943.  R. M. HEINTZ ET AL  2,334,002
MEANS FOR MOUNTING ROTATING ASSEMBLIES
Filed Jan. 5, 1942
Fig. 1.
Fig. 2.
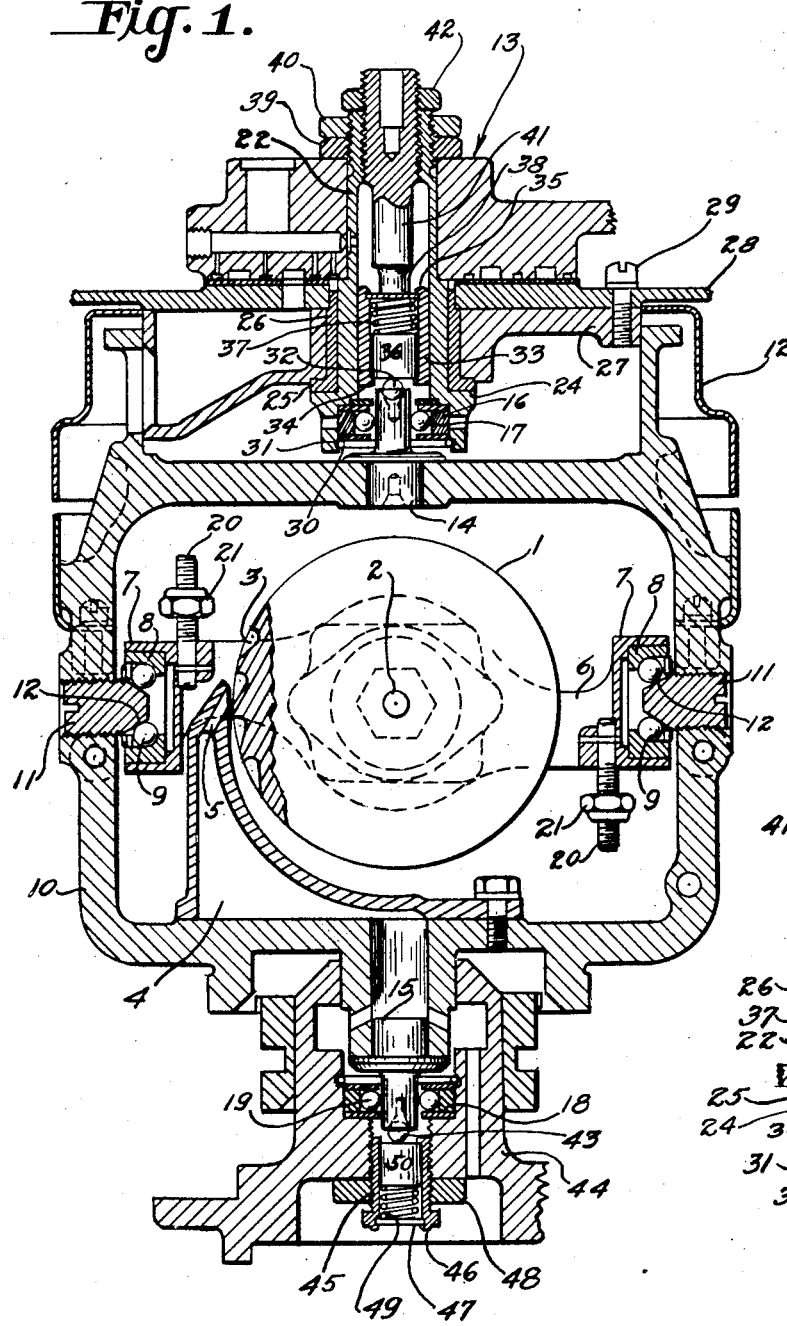
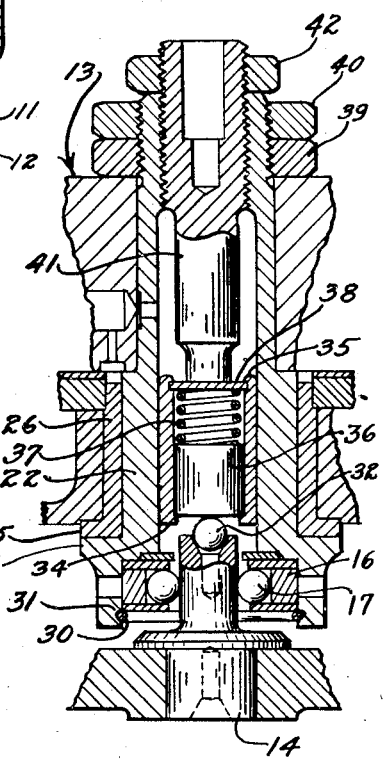
Inventors
RALPH M. HEINTZ.
BERT G. CARLSON
By Frank H. Harmon
Attorney Patented Nov. 9, 1943

2,334,002

UNITED STATES PATENT OFFICE 2,334,002

MEANS FOR MOUNTING ROTATING ASSEMBLIES

Ralph M. Heintz, Cleveland, and Bert G. Carlson, Erieside, Ohio, assignors to Jack & Heintz, Inc., Cleveland, Ohio Application January 5, 1942, Serial No. 425,596

3 Claims. (Cl. 308—174)

This invention relates to an improved method and means for mounting and for shock absorption of a gimbal frame for freedom of rotation in one plane and more particularly one that is adapted to carry a rotor capable of rotation in the other two planes.

One of the primary objects of this invention is to provide a suitable means for shock absorption for the gimbal and its rotor assembly which means will, under normal operating conditions, be sufficiently effectively rigid so as to avoid end play between the gimbal and its bearings and thus interfere with the proper operation of the rotor assembly and, on the other hand, one that will readily and automatically become effective as an adequate absorber of shocks of such magnitude that would otherwise bring about breakage or misalignment of the component parts of the assembly and consequent malfunctioning of the same.

Another important object is to provide a means for temperature compensation so as to maintain the correct freedom of rotation, without end play between the gimbal frame and its bearing supports.

In applying this invention, for instance, to a device such as a directional gyroscope assembly for use in automatic pilots, it is proposed to use the conventional gimbal frame for carrying a horizontally disposed rotor, the gimbal assembly and its housing being made of light weight material such as magnesium and having a relatively high coefficient of expansion. In such an assembly it is proposed to provide gimbal trunnions and bearing assemblies therefor made of steel and enclosed by the housing and carried by a support.

It is also proposed to provide a shock absorber assembly for the gimbal bearing assembly comprising a spring operated steel plunger enclosed in a steel cage and adapted to present bearing surfaces for the outer ends of the gimbal trunnions. The resiliency of the force, and the magnitude thereof, actuating the steel plunger within its cage is accurately predetermined so that under normal operating conditions the effect is the same as if there were no resiliency in the mounting of the plunger, but upon a severe shock of predetermined magnitude that might otherwise tend to bring about end play, breakage, misalignment or malfunctioning of the gyroscope assembly, the trunnion compresses the spring momentarily and sufficiently to relieve such shock. Due to the rigidity of the shock absorber under normal conditions and up to a shock force equal to approximately four times the weight of the assembly under abnormal conditions, the gimbal and its bearings are maintained in a predetermined relationship and in a fixed axis of relative rotation equal to that accomplished by a rigid mounting with no springs, or the like.

In order to maintain this accurately predetermined relationship, it is proposed to provide for temperature compensation in order to allow for the difference in the coefficients of expansion between the gimbal assembly and housing made of material of a relatively high coefficient of expansion such as magnesium and the gimbal trunnion, bearing and plunger assembly made preferably of steel having a relatively low coefficient of expansion. It has been found that one mode of accomplishing this is to interpose between the steel of the trunnions and the bearing assembly an element of aluminum, or alloy thereof, having a predetermined coefficient of expansion less than that of magnesium and greater than that of steel, in order to compensate for the difference of expansion or contraction between the magnesium and steel assemblies.

With the foregoing and other objects in view, the invention resides in the new and novel method and means hereinafter set forth in the following specification and appended claims, certain embodiments thereof being illustrated in the accompanying drawing, in which the figure is a view in vertical section taken through an automatic pilot directional gyroscope assembly and housing, showing a horizontally disposed spinning gyroscope rotor, its mounting in a gimbal frame, and the new and novel mount and shock absorber for the gimbal frame and assembly.

Referring more particularly to the drawing, and so far as this invention may be applicable to gyroscopic assemblies especially those for use in automatic pilots, only those portions of the assembly that are directly involved with the present new and novel method and means of shock absorbing mounting and temperature compensation necessitate any detailed discussion.

With this in mind, there is shown generally a directional indicator air gyro 1, mounted for spinning about a horizontal axis 2, and provided with buckets 3 which are impinged by air coming from a suitable source into the chamber 4 and thence through the air jets 5 to spin the gyro in a clockwise direction as viewed in the figure. The gyro casing is carried by arms 6 that terminate in circular flanges 7 to receive a ball bearing assembly including races 8 and balls 9. The gimbal ring 10 for supporting the gyro is internally screwthreaded to receive diametrically opposed horizontally adjustable screwthreaded trunnions 11 having conical faces 12 to engage the balls 9 to form a bearing for the rotation of the gyro casing about a horizontal axis in its gimbal frame support.

The gimbal frame is provided with a housing 12 of light metal, such as magnesium, or the like, and is rotatable about a vertical axis in bearings carried by a support, generally indicated at 13. The magnesium gimbal frame 10 is provided with vertically diametrically opposed trunnions 14 and 15 which rotate in corresponding upper and lower ball bearing assemblies including upper races 16 and balls 17 and lower races 18 and balls 19, the axis of which coincide with the vertical axis of rotation of the gimbal frame, while the axis of the trunnions 11 coincides with that of the horizontal axis of rotation of the gyro in the gimbal frame. The gyro supporting ring 6 may be provided with adjustable balancing weights comprising screw bolts 20 and nuts 21. As shown at the upper end of the assembly in the figure, the bearing assembly for the trunnion 15 is held and supported by the support 13 in the following manner. Into the support is fitted a steel sleeve 22, provided with a shoulder 24 to bear against and in rotative relationship with a corresponding shoulder 25 of a steel sleeve 26 carried by a manganese flanged sleeve 27, which in turn is secured to the housing cover plate 28 of steel by screws 29. There is provided a suitable clearance between the upper surface of the stationary support 13 to provide for freedom of rotation of the gyroscope assembly and housing about the gimbal trunnions on a vertical axis.

The ball bearing assembly is removably fitted in the sleeve 22 and held in place by a spring ring 30 fitting in a notch 31 of the sleeve. The balls 17 engage the periphery of the conical trunnion 14 above the base of the latter so as to permit relative vertical movement between the trunnion and the bearings so far as their particular relationship and construction is concerned.

As stated before, one of the primary objects of the present invention is to provide a suitable shock absorber for the assembly. This may be accomplished in the following manner. The top end of the steel trunnion 14 is counterbored to receive a steel ball 32 the upper surface of which extends beyond that of the trunnion. Within the steel sleeve 22 is fitted for longitudinal movement a steel cage 33 having an inturned flange 34 at its lower end and an inturned flange 35 at its upper end to house and confine a slidable steel plunger 36 and compression spring 37 bearing against the plunger to force it downwardly and also bearing against the plate 38 engaged by the flange 35. As a matter of assembly the plunger and spring are inserted in the cage 33 and, after the spring is placed under proper predetermined compression, the upper end of the cage is turned in to form the confining flange 35.

Thus, the bearing assembly is locked in place in the stationary support 13 by means of the sleeve 22, shoulders 24 and 25 and nuts 39 and 40 on the sleeve 22.

The shock absorbing assembly is resiliently held in position so that the steel plunger 36 is in engagement with the trunnion ball 32 by means of a rod 41, the upper end of which is adjustably screwfitted in the steel sleeve 22 and held in place by a lock nut 42, and the lower end of which is reduced in dimensions to bear on the spring pressed plate 38 and be clear of the inturned flange 34.

In the normal operation of the assembly any appreciable resiliency in the shock absorbing assembly that would permit relatively vertical movement between the trunnion and its bearings 17 and support 13 is preferably avoided so as to eliminate end play which, if transmitted to the gyro rotor would cause the latter to deviate from its proper axis of rotation. Therefore, the tension of the spring 37 and the longitudinal adjustment of the cage and plunger with respect to the trunnion ball 32 are all taken into account and predetermined so that under normal operation the plunger 36, in fact, presents and constitutes for all practical purposes a rigid end bearing member for the trunnion ball 32 and thus prohibits any end play of the gyro assembly, gimbal and housing. It has been found practical to so predetermine these relationships and factors involved that nothing short of a sudden shock approximately coincident with the trunnion axis equal in degree to four times the weight of the assembly will bring about any measurable compression of spring 37 or any consequent relative longitudinal movement between the trunnion bearing and its bearings and support. It is, of course, to be understood that such longitudinal movement will upset the proper rotation of the gyro rotor but this will only be momentary during the sudden shock period after which the assembly will return to normal and the rotation of the gyro rotor will return to and continue to be normal. Meanwhile the shock absorbing assembly has accomplished its purpose of absorbing any shock that might be severe eough to bring about wear, breakage or misalignment and consequent destruction or malfunctioning of the gyro assembly.

As a further precaution and in accordance with another object of the present invention, provision is made for temperature compensation between the moving and stationary parts and the variance in coefficients of expansion of the materials of which such parts are constructed. Considering the overall height of the gyro gimbal and housing as a magnesium element and each of the upper and lower gimbal trunnions 14 and 15 and their respective shock absorbing assemblies as a steel element and as factors to be considered in magnified ratios for temperature compensation under extreme conditions so far as the overall vertical dimension is concerned, the general relative proportions shown in the drawing are eight for the magnesium element as to one for each steel element. To compensate for temperature the rod 41 is constructed of aluminum or suitable alloy and its length is approximately that of the steel element. The material of the rod 41 is predetermined so as to have such a coefficient of expansion that will make up for or compensate for the variance in coefficients of expansion of the steel gimbal trunnions, their bearings and shock absorbing assemblies and the magnesium gimbal frame and housing over a predetermined wide range of temperature conditions, so as to maintain constant bearing clearances and avoid end play.

It is to be understood that the lower steel gimbal trunnion 15 with its steel ball bearings 19 and steel race 18 is to be similarly shock absorbed and temperature compensated, there being shown only, in the interest of avoiding repetition in description, the same kind of steel trunnion ball 43, a steel sleeve 44, into which a steel cage 45 with a flange 46 and a retaining plate 47 is screwed and held in place by a lock nut 48, to enclose a compression spring 49 to urge a steel plunger 50 upwardly to form an end bearing for the trunnion ball 43.

From the foregoing, it will be seen that there has been provided a directional gyro assembly suitable for use in an automatic pilot and wherein the rotor and its gimbal frame are mounted for three degrees of freedom and wherein the assembly is balanced and provided with shock absorbing means that effectively absorb shocks that might interfere with proper operation but which under normal operation constitutes an effectively rigid end bearing assembly for the gimbal trunnions giving the gimbal and its housing freedom of rotation about a vertical axis. Additionally there has been provided an effective means for temperature compensation for the component parts and their varying coefficients of expansion, and consequently constant bearing clearances are maintained over a predetermined relatively wide range of temperature conditions.

It is to be understood that the above described method and means of shock absorption and temperature compensation is equally applicable to gimbal trunnions of horizon gyro assemblies in which the gyro rotor rotates about a vertical axis and the gimbal about a horizontal axis and is also equally applicable to any assemblies calling for the mounting of a body within a support to take care of relative rotation therebetween.

We claim:

1. In combination in a gyroscope rotor assembly for automatic pilots including a gimbal ring mounted for freedom of movement about its top and bottom trunnions as a vertical axis of rotation in bearing assemblies carried by a support, of a shock absorbing device for said gimbal ring and each of said trunnions, each of said devices comprising a ball carried by and extending past the outer extremity of its trunnions, a slidably mounted compression spring actuated block and a cage and guide for confining said block and spring, adjustment means for said cage for limiting the end abutment engagement of said trunnion ball with said block, adjustment means for adjusting the relationship between said compression spring and said block for the purpose of effectively maintaining said spring operated block as a rigid end bearing for its trunnion under normal operation of said gimbal and for automatically effectively maintaining said spring operated block as a shock absorbing element only upon the existence of an abnormal external force thrust upon said gimbal substantially in alignment with said trunnion in excess of a predetermined normal amount, said gimbal having a housing and a support therefor, said housing being constructed of a material having a relatively high coefficient of expansion and said trunnions and their bearing and shock absorbing assemblies being constructed of a material having a relatively low coefficient of expansion, and means for providing temperature compensation between said housing and said bearing and shock absorber assemblies over a predetermined range of temperature variations, said means comprising an element interposed therebetween and forming part of said adjustment means, said element being of a material having a predetermined coefficient of expansion of a degree between that of said housing and said bearing and shock absorber assemblies and to such a degree as to provide automatic temperature compensation for variance in expansion and contraction of the elements between which it is interposed.

2. In a mount for a gimbal ring providing freedom of movement of the same about its top and bottom trunnions in bearing assemblies, shock absorbing device for said gimbal ring and each of said trunnions comprising a ball carried by and extending past the outer extremity of its trunnion, a slidably mounted compression spring actuated block, a cage and guide for confining said block and spring, means for aligning and limiting the end abutment engagement of said trunnion ball with said block, screwthreaded adjustment means for adjusting the compression of said spring and consequently its pressure on said block to a predetermined amount, whereby said block is adapted to constitute a rigid bearing under normal operation of said gimbal within its support and automatically effectively constitute shock absorbing elements only upon the existence of an abnormal external force thrust upon said support and substantially in alignment with said trunnion in excess of a predetermined normal amount, said gimbal having a housing and a support therefor, said housing being constructed of a material having a relatively high coefficient of expansion and said trunnion and its bearing and shock absorbing assembly being constructed of a material having a relatively low coefficient of expansion, and means for providing temperature compensation between said housing and said bearing and shock absorber assemblies over a predetermined range of temperature variations, said means comprising an element interposed therebetween and forming part of said adjustment means, said element being of a material having a predetermined coefficient of expansion of a degree between that of said housing and said bearing and shock absorber assemblies and to such a degree as to provide automatic temperature compensation for variance in expansion and contraction of the elements between which it is interposed.

3. The combination in a gimbal frame and a housing therefor constructed of material having a relatively high coefficient of expansion and gimbal trunnions and gimbal shock absorbing assemblies constructed of material having a relatively low coefficient of expansion, adjustment means for said bearing and shock absorber assemblies, means for providing temperature compensation between said housing and said bearing and shock absorber assemblies over a predetermined range of temperature variations, said compensation means comprising an element interposed therebetween and forming part of said adjustment means, said element being of a material having a predetermined coefficient of expansion of a degree between that of said housing and said bearing and shock absorber assemblies and to such a degree as to provide automatic temperature compensation for variance in expansion and contraction of the elements between which it is interposed.

RALPH M. HEINTZ.
BERT G. CARLSON.